(12) United States Patent
Krauss

(10) Patent No.: US 6,374,120 B1
(45) Date of Patent: Apr. 16, 2002

(54) ACOUSTIC GUIDE FOR AUDIO TRANSDUCERS

(75) Inventor: John Krauss, Carlsbad, CA (US)

(73) Assignee: Denso Corporation, Aichi-Ken (JP)

(*) Notice: Subject to any disclaimer, the term of this patent is extended or adjusted under 35 U.S.C. 154(b) by 0 days.

(21) Appl. No.: 09/250,624

(22) Filed: Feb. 16, 1999

(51) Int. Cl.⁷ .................. H04B 1/38; H04M 1/00; H04R 1/02

(52) U.S. Cl. ............. 455/550; 455/90; 379/433.02; 381/386

(58) Field of Search .................. 455/90, 550, 575; 379/433, 420, 444, 447, 433.02, 420.01, 420.02, 420.03, 420.04; 381/152, 71.7, 345, 386, 395, 392

(56) References Cited

U.S. PATENT DOCUMENTS 3,257,516 A * 6/1966 Knowles .................. 381/345
4,845,760 A * 7/1989 Awakowicz et al. ........ 381/188
5,210,793 A * 5/1993 Carlson et al. ............. 379/433
5,790,679 A * 8/1998 Hawker et al. ............. 381/163
5,999,821 A * 12/1999 Kaschke .................... 455/550
6,002,949 A * 12/1999 Hawker et al. ............. 455/569

FOREIGN PATENT DOCUMENTS

| GB | 2180722 | * | 4/1987 |
| JP | 44111018182 | * | 1/1999 |
| WO | 81/00656 | * | 3/1981 |

* cited by examiner

Primary Examiner—Vivian Chang
Assistant Examiner—Charles N. Appiah
(74) Attorney, Agent, or Firm—Fish & Richardson P.C.

(57) ABSTRACT

The present disclosure describes a receptacle for acoustically guiding tones emitted from the side of the transducer. The receptacle is adapted to be mounted onto an acoustic transducer within a housing for acoustically sealing and guiding sound from the transducer. The receptacle has a depression on the bottom surface adapted for mating with and sealing the acoustic transducer.

19 Claims, 4 Drawing Sheets

ACOUSTIC GUIDE FOR AUDIO TRANSDUCERS

TECHNICAL FIELD

The present specification generally relates to communication devices. More particularly, the present specification describes an acoustic guide for audio transducers.

BACKGROUND

Communication devices are presently being extensively utilized in a wide range of applications. Communication devices typically include a ringer enabling a user to receive audible notification of incoming calls. Manufacturing the communication device requires a way of acoustically coupling the transducer to the housing.

Audio transducers for generating audio tones are used as ringers in a cellular telephone. The ring tone needs to be loud enough to be heard. However, government regulations prohibit the ring tone from going towards the user's ear. Unfortunately, typical audio transducers for mounting on printed circuit boards emit their maximum audio levels in a direction perpendicular to the printed circuit board. The sound emitted from the transducer reflects off the inner surface of the housing enclosing the circuit board and bounces around inside the housing. As a result, the sound coming out of an audio port opening in the housing is often muffled and attenuated.

SUMMARY

The inventor noticed that to improve the ringing efficiency of a communication device, it is advantageous to provide an acoustic guide between a printed circuit board mounted audio transducer and an audio port opening on the side of the telephone housing. Ringing tones are emitted from the side of the transducer. The tones are acoustically guided through a resonant cavity formed by a hole on the side of the acoustic guide and an opening on the side of the transducer.

The present disclosure describes a receptacle for acoustically guiding tones emitted from the side of the transducer. The receptacle is mounted onto an acoustic transducer within a housing for acoustically sealing and guiding sound from the transducer. The receptacle has a depression on the bottom surface adapted for mating with and sealing the acoustic transducer. In a preferred embodiment, the sidewalls of the depression are inclined at approximately one degree.

An acoustic waveguide is formed by a resonant cavity on one side of the receptacle. The resonant cavity abuts an opening of the transducer on one side and an audio port opening of the housing on the other. In a further preferred embodiment, the physical volume of the resonant cavity is optimized to match the acoustic wave impedance with the operating frequency of the acoustic transducer. The acoustic waveguide formed by the resonant cavity diverts sound from the acoustic transducer at approximately 90 degrees from the perpendicular.

A plurality of standoff features is. formed on top of the receptacle. The plurality of standoff features provide optimum compression to the receptacle such that compression provides acoustic and weatherproof seal as well as shock and vibration absorption for the transducer. In another preferred embodiment, the plurality of standoff features has different heights to accommodate the curvature of the housing. In a particular embodiment, there are four standoff features.

In a further particular embodiment, the receptacle includes a tab formed on a side of the receptacle. The tab is used for easy removal of the receptacle from the transducer. The receptacle is molded as one piece of elastomeric material.

The present disclosure also describes a phone handset. The handset includes a housing, a printed circuit board, an acoustic transducer, and a receptacle as described above.

The details of one or more embodiments are set forth in the accompanying drawings and the description below. Other embodiments and advantages will become apparent from the following description and drawings, and from the claims.

BRIEF DESCRIPTION OF THE DRAWINGS

Like reference numbers and designations in the various drawings indicate like elements.

DETAILED DESCRIPTION

Figure 1A:
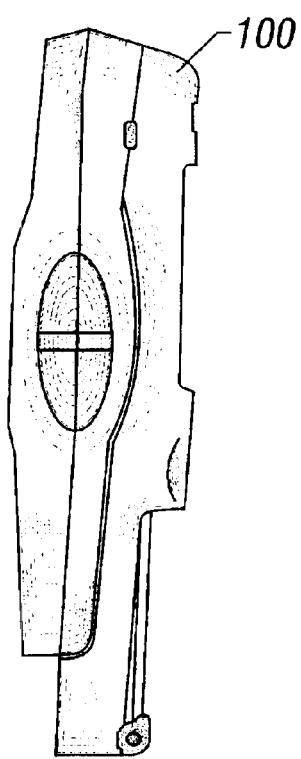
FIG. 1A is a top view of cellular telephone housing.
Figure 1B:
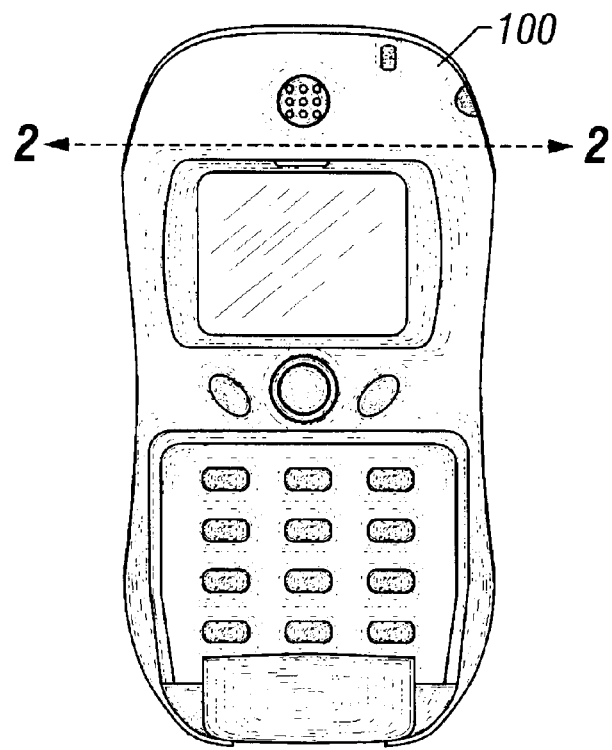
FIG. 1B is a side view of cellular telephone housing.

A receptacle 202 for mounting a ringer alert transducer 200 within a housing 100 is disclosed. The receptacle 202 is molded from a flexible material providing an acoustic seal between the transducer 200 and housing 100. FIGS. 1A and 1B show the top and side view respectively of cellular telephone housing.

The standoff features 204 are nipple-shaped devices that are formed on top of the molded receptacle 202. When the housing 100 presses down on the standoff features 204, the standoff features 204 apply sufficient force to compress the flexible molded receptacle 202 around the ringer alert transducer 200 so that the inside surfaces 205 of the receptacle 202 are pressed against, or loosely fit around, the outside surfaces 201 of the transducer. The inner dimension of the element is preferably about $4/1000$ inch smaller than the outside of the transducer. Each of the four standoff features 204 has a different height to accommodate the curvature of inside surface 203 of the housing 100. The optimum compression applied provides acoustic and weatherproof seal for the transducer 200. The acoustic seal minimizes muffling of the sound. The weatherproof seal can prevent the water from dispersing throughout the housing.

The standoff features 204 also provide shock and vibration absorption to prevent audible distortion and gradual degradation of the transducer performance.

Figure 2A:
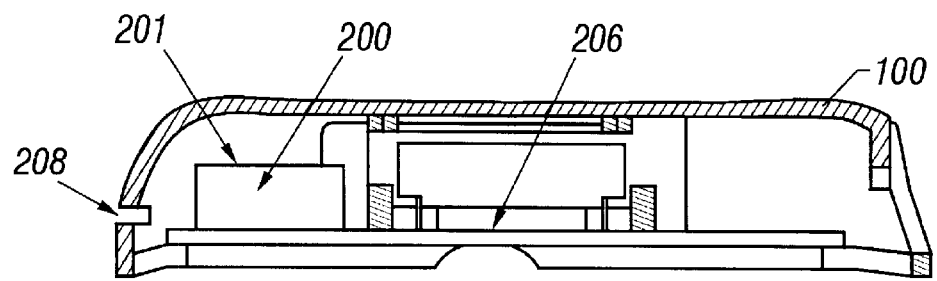
FIG. 2A is a cross-sectional view of the housing showing a transducer mounted on top of a printed circuit board.
Figure 2B:
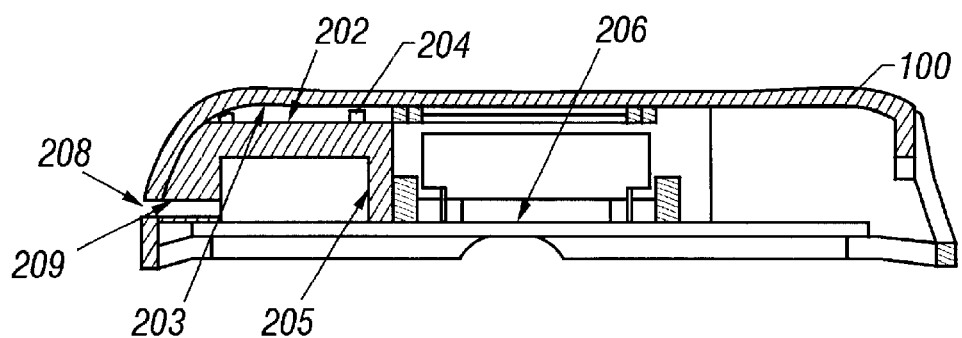
FIG. 2B is another cross-sectional view of the housing showing a receptacle fitted on top of the transducer.

FIG. 2A shows a cross-sectional view of the housing with a printed circuit board 206 and the transducer 200. FIG. 2B is another cross-sectional view of the housing with the flexible receptacle 202 mounted on top of the transducer 200. The cavity 209 is shown leading the sound to an edge of the telephone.

The receptacle 202 has a hole 302 on one side to guide the sound from the transducer 200 to the audio port opening 208 on the side of the housing 100. The hole 302 is aligned with an opening 304 on the side of the transducer 200 thereby providing an electroacoustic interface. The side of the flexible receptacle 202 with the hole 302 also abuts the interior surface of the housing 100 at the audio port opening 208.

Figure 3A:
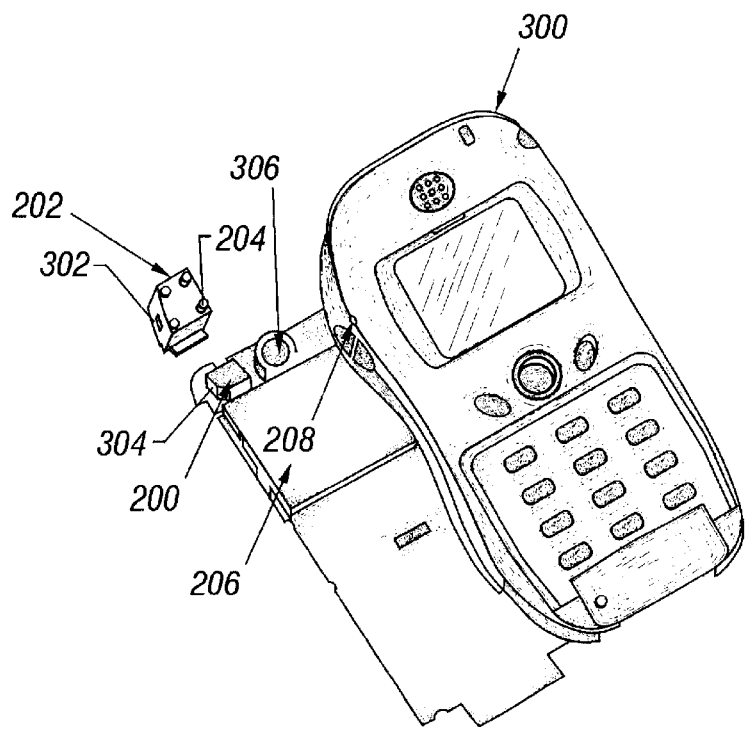
FIG. 3A is an exploded perspective view of the telephone handset with the receptacle separate from the transducer.
Figure 3B:
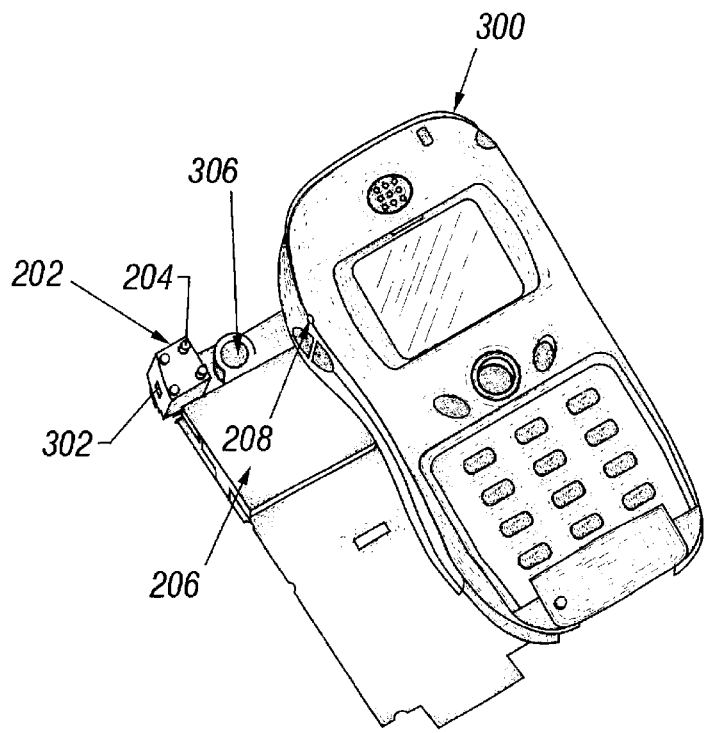
FIG. 3B is an exploded perspective view of the telephone handset showing the receptacle mounted on top of the transducer.

FIG. 3A shows an exploded perspective view of the telephone handset 300 with the flexible receptacle 202 separate from the transducer 200. FIG. 3B shows the flexible receptacle 202 fitted on top of the transducer 200. The flexible receptacle 202 provides acoustic seal and guide for the tones generated by the transducer 200. A speaker 306 produces certain sounds that are carried to the user's ear through openings 208 on the housing 300.

Figure 4A:
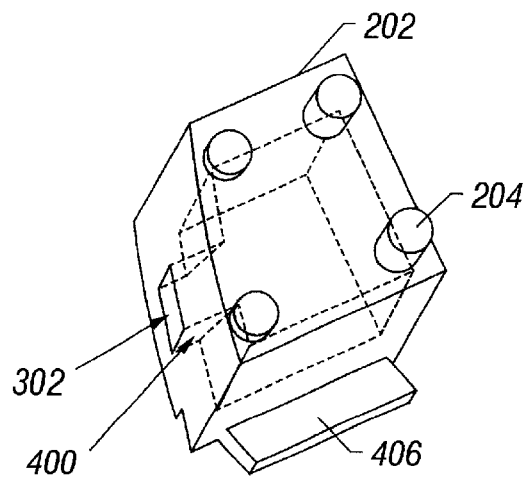
FIG. 4A is a top perspective view of the receptacle.
Figure 4B:
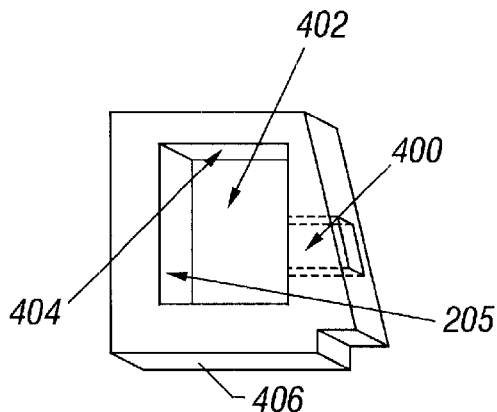
FIG. 4B is a bottom perspective view of the receptacle.

FIGS. 4A and 4B show top and bottom perspective views respectively of the flexible receptacle 202. The hole 302 in the flexible receptacle 202 and the opening 304 on the side of the transducer 200 preferably forms a resonant cavity 400. The cavity 400 acts as an acoustic waveguide that diverts sound at approximately a 90-degree angle with low loss and good acoustic isolation. The volume of the resonant cavity 400 is optimized to match the acoustic wave impedance with an operating frequency of the ringer alert transducer 200. The volume can also be chosen to optimize the sound pressure level output. A tab 406 is also formed on one side of the flexible receptacle 202 to facilitate removal of the receptacle 202 from the transducer 200.

Figure 4C:
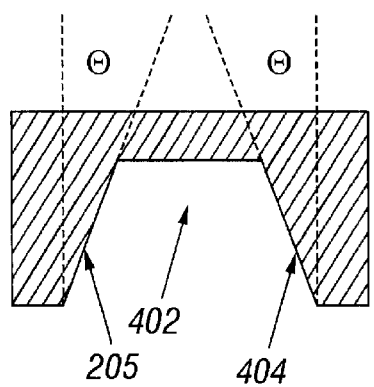
FIG. 4C is a cross-sectional view of the receptacle.

A cross-sectional view of the flexible receptacle in FIG. 4C shows the depression 402 formed on the bottom side formed from the inner surfaces 205. The depression 402 fits snugly over the transducer 200 and provides easy alignment and seal. Sidewalls of the depression 402 are slightly inclined. In a preferred embodiment, the inclination angle, θ, is approximately one degree.

Advantages of the flexible receptacle 202 include low cost and simple fabrication process. The receptacle 202 is molded as one piece of resilient material. The snug fit of the depression 402 over the transducer 200 provides easy alignment and seal for low cost assembly of cellular phones. The design of the resonant cavity 400 with an opening directed to the side of the housing at approximately 90 degrees from the perpendicular improves the ringer volume while directing sound away from earpiece for hearing safety. The top walls of the receptacle can have a uniform thickness. The standoff features allow the receptacle to abut against any shaped inner surface, e.g. an irregular shaped inner surface as shown in FIG. 2B.

A number of embodiments of the present invention have been described. Nevertheless, it will be understood that various modifications may be made without departing from the spirit and scope of the invention. Accordingly, other embodiments are within the scope of the following claims.

What is claimed is:

1. A receptacle assembly adapted to be fitted onto an acoustic transducer within a housing for acoustically sealing and guiding sound from the transducer, comprising:
   a receptacle device, formed of flexible material, having a first surface adapted to mate with a first side wall of the transducer, a second surface substantially parallel to said first surface and adapted to mate with a second side wall of the transducer, a third surface adapted to mate with a third side wall of the transducer, a fourth surface adapted to mate with a third side wall of the transducer, said third and fourth surfaces being substantially parallel to each other and perpendicular to said first surface and said second surface, a fifth surface substantially perpendicular to said first, second, third and fourth surfaces and adapted to mate with a top surface of the transducer, said surfaces forming a depression on said device that is adapted for mating with and sealing the acoustic transducer, such that said fifth surface presses the top surface of the transducer and said first, second, third and fourth surfaces mate with side walls of the transducer, wherein each of said surfaces has an area smaller than an area of the respective mating surface on the transducer; and
   said receptacle device having an acoustic waveguide on said surfaces forming a resonant cavity, the resonant cavity abutting an opening of the acoustic transducer on one end and an audio port opening of the housing on the other end, such that the acoustic waveguide diverts sound from the acoustic transducer.

2. The receptacle assembly of claim 1, further comprising a plurality of standoff features formed on top of said receptacle device, said plurality of standoff features providing optimum compression to said receptacle device such that the compression provides acoustic and weatherproof seal as well as shock and vibration absorption for the transducer.

3. The receptacle assembly of claim 1, wherein the thickness of said surfaces are uniform.

4. The receptacle assembly of claim 1, wherein the thickness of said fifth surface is uniform.

5. The receptacle assembly of claim 1, further comprising a tab formed on one side of said receptacle device to facilitate removal of said receptacle device from the transducer.

6. The receptacle assembly of claim 1, wherein said receptacle device is molded as one piece of elastomeric material.

7. The receptacle assembly of claim 2, wherein each of said plurality of standoff features has a different height to accommodate the curvature of the inner surface of the housing.

8. The receptacle assembly of claim 2, wherein there are four standoff features.

9. The receptacle assembly of claim 1, wherein said first, second, third and fourth surfaces are inclined at approximately one degree.

10. The receptacle assembly of claim 1, wherein the volume of said resonant cavity is optimized to match the acoustic wave impedance with the operating frequency of the acoustic transducer.

11. The receptacle assembly of claim 1, wherein the acoustic waveguide diverts sound from the acoustic transducer at approximately 90 degrees from the perpendicular.

12. A phone handset, comprising:
   a housing having an internal surface;
   a printed circuit board containing communication parts disposed within said housing;
   a speaker operative to generate sound waves from input voice signals and output said sound waves in a direction substantially perpendicular to the printed circuit board;
   an acoustic transducer operative to generate tones, said acoustic transducer including a top surface and a bottom mounted on said printed circuit board; and
   a receptacle device formed of a resilient material and fitted over the acoustic transducer separately from the speaker such that a portion of the receptacle device is compressed between the internal surface of the housing and the top surface of the acoustic transducer, said receptacle device including an acoustic waveguide that diverts sound from the acoustic transducer in a direction substantially parallel to the printed circuit board.

13. The receptacle assembly of claim 12, further comprising a plurality of standoff features formed on top of said receptacle device, said plurality of standoff features providing optimum compression to said receptacle device such that the compression provides acoustic and weatherproof seal as well as shock and vibration absorption for the transducer.

14. The receptacle assembly of claim 12, further comprising a tab formed on one side of said receptacle device to facilitate removal of said receptacle device from the transducer.

15. The phone handser of claim 12, wherein said receptacle devide is molded as one piece of elastomeric material.

16. The phone handset of claim 12, wherein the acoustic transducer includes a side wall substantially perpendicular to the printed circuit board, said side wall including an opening operative to emit tones, wherein the receptacle device includes a side wall having an inner surface contacting the side wall of the acoustic transducer, said side wall including a hole adjacent the opening in the acoustic transducer side wall and extending through a side wall substantially perpendicular to the printed circuit board, and wherein the opening in the acoustic transducer and the hole in the receptacle device form the acoustic waveguide.

17. The phone handset of claim 16, wherein the housing includes an audio port adjacent the hole in the receptacle device.

18. The phone handset of claim 12, wherein the acoustic transducer comprises a ringer alert transducer.

19. The phone handset of claim 12, wherein the portion of the receptacle device that is compressed between the internal surface of the housing and the top surface of the acoustic transducer comprises a solid panel that acoustically seals the top surface of the acoustic transducer.

* * * * *